US011764715B2

(12) United States Patent
Kokubo et al.

(10) Patent No.: US 11,764,715 B2
(45) Date of Patent: Sep. 19, 2023

(54) MOTOR DRIVE CONTROL DEVICE AND MOTOR DRIVE CONTROL METHOD

(71) Applicant: MINEBEA MITSUMI Inc., Nagano (JP)

(72) Inventors: Hiroki Kokubo, Fukuroi (JP); Shinji Totsuka, Fukuroi (JP); Shigemi Masuda, Fukuroi (JP)

(73) Assignee: MINEBEA MITSUMI Inc., Nagano (JP)

(*) Notice: Subject to any disclaimer, the term of this patent is extended or adjusted under 35 U.S.C. 154(b) by 21 days.

(21) Appl. No.: 17/477,664

(22) Filed: Sep. 17, 2021

(65) Prior Publication Data

US 2022/0123676 A1 Apr. 21, 2022

(30) Foreign Application Priority Data

Oct. 19, 2020 (JP) ................................. 2020-175520

(51) Int. Cl.
*H02P 21/09* (2016.01)
*H02P 21/18* (2016.01)
*H02P 21/22* (2016.01)
*H02P 27/12* (2006.01)

(52) U.S. Cl.
CPC ............. *H02P 21/09* (2016.02); *H02P 21/18* (2016.02); *H02P 21/22* (2016.02); *H02P 27/12* (2013.01)

(58) Field of Classification Search
CPC .......... H02P 21/09; H02P 21/18; H02P 21/22; H02P 27/12; H02P 21/08; H02P 21/14; H02P 6/28
See application file for complete search history.

(56) References Cited

U.S. PATENT DOCUMENTS

| 2012/0068639 A1* | 3/2012 | Sejimo | H02P 21/0089 |
| | | | 318/400.02 |
| 2018/0091080 A1* | 3/2018 | Sumasu | H02P 21/16 |
| 2020/0059182 A1* | 2/2020 | Watahiki | H02P 21/06 |

FOREIGN PATENT DOCUMENTS

JP 2012-130100 A 7/2012

* cited by examiner

*Primary Examiner* — Muhammad S Islam
*Assistant Examiner* — Bradley R Brown
(74) *Attorney, Agent, or Firm* — Pearne & Gordon LLP (57) ABSTRACT

A motor drive control device includes a control circuit configured to output a drive control signal for driving a motor, and a drive circuit configured to drive the motor with the drive control signal. The control circuit calculates a lead angle value δ allowing a d-axis current value Id of a two-phase rotating coordinate system to be zero with a q-axis current value Iq calculated from drive current values Iu, Iv, and Iw of a coil of the motor and rotation speed ω of a rotor of the motor. The control circuit performs a space vector conversion based on an angle σ obtained by adding the lead angle value δ and rotation angle θ and voltage command value Vref of the two-phase rotating coordinate system calculated to reduce a difference between the q-axis current value Iq and a q-axis current command value Iqref, to generate the drive control signal.

9 Claims, 9 Drawing Sheets

| Iq(A) ω(rpm) | 0 | 0.1 | 0.2 | 0.3 | ... |
|---|---|---|---|---|---|
| 0 | σ_11 | σ_12 | σ_13 | σ_14 | ... |
| 100 | σ_21 | σ_22 | σ_23 | σ_24 | ... |
| 200 | σ_31 | σ_32 | σ_33 | σ_34 | ... |
| 300 | σ_41 | σ_42 | σ_43 | σ_44 | ... |
| ⋮ | ⋮ | ⋮ | ⋮ | ⋮ | ⋱ |

MOTOR DRIVE CONTROL DEVICE AND MOTOR DRIVE CONTROL METHOD

CROSS-REFERENCE TO RELATED APPLICATIONS

This application claims the benefit of Japanese Application No. JP2020-175520 filed on Oct. 19, 2020, the entire disclosure of which is hereby incorporated herein by reference.

TECHNICAL FIELD

The present invention relates to a motor drive control device and a motor drive control method.

BACKGROUND ART

Permanent magnet synchronous motors (PMSMs) serving as brushless DC motors are roughly classified, by the arrangement of the permanent magnet, into a surface permanent magnet synchronous motor (SPMSM) having a permanent magnet attached to the surface of a rotating element, and an interior permanent magnet synchronous motor (IPMSM) having a permanent magnet embedded in a rotating element.

Generally, it is known that the torque of a permanent magnet synchronous motor (PMSM) is expressed by the following equation.

$$T_e = P(\Psi I_q + (L_d - L_q) I_d \times I_q) \quad (1)$$

In Equation (1) above, Te is generated torque, P is the number of pole pairs, $\Psi$ is magnetic flux of a permanent magnet (rotor), Ld is d-axis inductance, Lq is q-axis inductance, Id is the d-axis current value, Iq is the q-axis current value, $\Psi Iq$ is magnet torque, and "(Ld−Lq)Id*Iq" is reluctance torque.

Here, in the case of the interior permanent magnet synchronous motor (IPMSM), the q-axis inductance Lq and the d-axis inductance Ld are not equal. Therefore, as can be understood from Equation (1), it is possible to maximize the efficiency of the motor by controlling the d-axis current value Id to adjust a value of the reluctance torque.

On the other hand, in the case of the surface permanent magnet synchronous motor (SPMSM), the d-axis inductance Ld and the q-axis inductance Lq are equal (Ld=Lq), and thus, no reluctance torque is generated. Therefore, as can be understood from Equation (1), it is possible to maximize the efficiency of the motor when the d-axis current value Id is zero.

Conventionally, a motor drive control device for driving a brushless DC motor by vector control is known (for example, JP 2012-130100 A).

CITATION LIST

Patent Literature

Patent Document 1: JP 2012-130100 A

SUMMARY OF INVENTION

Technical Problem

For example, in the motor drive control device disclosed in JP 2012-130100 A, a d-axis current command value is always set to zero when a general vector control arithmetic operation is performed. That is, in the motor drive control technique according to JP 2012-130100 A, a q-axis current value and a d-axis current value of a two-phase rotating coordinate system are each calculated from a current flowing in each phase of a motor, and the motor drive control device performs control so that the d-axis current value is always zero. Therefore, the arithmetic operation is complicated. Accordingly, a conventional motor drive control device that performs a vector control arithmetic operation with the d-axis current value always set to zero requires a program processing device (for example, a microcontroller) having high processing capacity to execute complex arithmetic operations at high speed, and thus, the cost of the entire system increases.

The present invention is contrived to solve the above-mentioned problems, and an object of the present invention is to reduce a load of a vector control arithmetic operation allowing the d-axis current value to be zero.

Solution to Problem

A motor drive control device according to an exemplary embodiment of the present invention includes a control circuit configured to output a drive control signal for driving a motor, and a drive circuit configured to drive the motor on the basis of the drive control signal output from the control circuit, and the control circuit includes a drive current value acquisition unit configured to acquire a drive current value of a coil of the motor, a rotation angle acquisition unit configured to acquire a rotation angle of a rotor of the motor, a rotation speed acquisition unit configured to acquire a rotation speed of the rotor, a q-axis current value calculation unit configured to calculate a q-axis current value of a two-phase rotating coordinate system on the basis of the drive current value acquired by the drive current value acquisition unit and the rotation angle of the rotor acquired by the rotation angle acquisition unit, a q-axis current command value calculation unit configured to calculate a q-axis current command value of the two-phase rotating coordinate system on the basis of a value (Sc) indicating a target state of an operation of the motor, a voltage command value calculation unit configured to calculate a voltage command value of the two-phase rotating coordinate system to reduce a difference between the q-axis current command value calculated by the q-axis current command value calculation unit and the q-axis current value calculated by the q-axis current value calculation unit, a lead angle control unit configured to calculate a lead angle value allowing a d-axis current value of the two-phase rotating coordinate system to be zero, on the basis of the q-axis current value calculated by the q-axis current value calculation unit and the rotation speed of the rotor acquired by the rotation speed acquisition unit, and a drive control signal generation unit configured to generate the drive control signal by performing a space vector conversion based on an angle obtained by adding the lead angle value calculated by the lead angle control unit and the rotation angle of the rotor, and the voltage command value calculated by the voltage command value calculation unit.

Advantageous Effects of Invention

According to an aspect of the present invention, it is possible to reduce a load of a vector control arithmetic operation allowing the d-axis current value to be zero.

DESCRIPTION OF EMBODIMENTS

1. Overview of Embodiment

First, an overview of a typical embodiment of the invention disclosed in the present application will be described. Note that, in the following description, reference numerals in the drawings corresponding to the constituent elements of the invention are mentioned in parentheses to denote examples.

[1] A motor drive control device (10, 10A) according to an exemplary embodiment of the present invention includes a control circuit (1) configured to output a drive control signal (Sd) for driving a motor (3), and a drive circuit (2) configured to drive the motor on the basis of the drive control signal output from the control circuit, and the control circuit (1) includes a drive current value acquisition unit (14) configured to acquire drive current values (Iu, Iv, and Iw) of coils (Lu, Lv, and Lw) of the motor, a rotation angle acquisition unit (12) configured to acquire a rotation angle (θ) of a rotor (31) of the motor, a rotation speed acquisition unit (13) configured to acquire a rotation speed (ω) of the rotor, a q-axis current value calculation unit (15) configured to calculate a q-axis current value (Iq) of a two-phase rotating coordinate system on the basis of the drive current value acquired by the drive current value acquisition unit and the rotation angle of the rotor acquired by the rotation angle acquisition unit, a q-axis current command value calculation unit (17) configured to calculate a q-axis current command value (Iqref) of the two-phase rotating coordinate system on the basis of a value (ωref, Tref) indicating a target state of an operation of the motor, a voltage command value calculation unit (19) configured to calculate a voltage command value (Vref) of the two-phase rotating coordinate system to reduce a difference between the q-axis current command value calculated by the q-axis current command value calculation unit and the q-axis current value calculated by the q-axis current value calculation unit, a lead angle control unit (20) configured to calculate a lead angle value (δ) allowing a d-axis current value (Id) of the two-phase rotating coordinate system to be zero, on the basis of the q-axis current value calculated by the q-axis current value calculation unit and the rotation speed of the rotor acquired by the rotation speed acquisition unit, and a drive control signal generation unit (22) configured to generate the drive control signal by performing a space vector conversion based on an angle obtained by adding the lead angle value calculated by the lead angle control unit and the rotation angle of the rotor, and the voltage command value calculated by the voltage command value calculation unit.

[2] In the motor drive control device according to [1] above, the lead angle value (δ) allowing the d-axis current value of the two-phase rotating coordinate system to be zero may be a value based on an angle (φ) of a vector of the voltage command value with respect to a q-axis when a component of the vector of the voltage command value in a d-axis direction coincides with a d-axis voltage value (Vd) at the time of the d-axis current value (Id) of zero.

[3] In the motor drive control device according to [1] or [2] above, the lead angle control unit may include correspondence relationship information (201) indicating a correspondence relationship among the rotation speed (ω) of the rotor, the q-axis current value (Id), and the lead angle value (φ, δ), and may calculate the lead angle value on the basis of the correspondence relationship information.

[4] In the motor drive control device according to [3] above, the correspondence relationship information may be a table having the lead angle value associated with every combination of the rotation speed of the rotor and the q-axis current value.

[5] In the motor drive control device according to [3] above, the correspondence relationship information may include a function expressed by Equation (5) described later, and in Equation (5), Vref is the voltage command value, ω is the rotation speed of the rotor, Lq is a q-axis inductance, Iq is the q-axis current value, and φ is the angle of the vector of the voltage command value with respect to the q-axis.

[6] In the motor drive control device according to any one of [2] to [5] above, the lead angle control unit may calculate the lead angle value by adding π/2 to the angle of the vector of the voltage command value with respect to the q-axis.

[7] In the motor drive control device (10) according to any one of [1] to [6] above, the value indicating the target state of the operation of the motor may be a target value of a rotation speed of the motor, and the q-axis current command value calculation unit may calculate the q-axis current command value to reduce a difference between the target value of the rotation speed of the motor and the rotation speed of the rotor acquired by the rotation speed acquisition unit.

[8] In the motor drive control device (10A) according to any one of [1] to [6] above, the value indicating the target state of the operation of the motor may be a target value of torque of the motor.

[9] A motor drive control method according to an exemplary embodiment of the present invention may include a first step (S2) of acquiring a rotation angle (θ) of a rotor (31) of a motor (3), a second step (S3) of acquiring a rotation speed of the rotor, a third step (S4) of acquiring a drive current value of a coil of the motor, a fourth step (S5) of calculating a q-axis current value of a two-phase rotating coordinate system on the basis of the drive current value acquired in the third step and the rotation angle of the rotor acquired in the first step, a fifth step (S6) of calculating a q-axis current command value of the two-phase rotating coordinate system on the basis of a value indicating a target state of an operation of the motor, a sixth step (S7) of calculating a voltage command value of the two-phase rotating coordinate system to reduce a difference between the q-axis current command value calculated in the fifth step and the q-axis current value calculated in the fourth step, a seventh step (S8) of calculating a lead angle value allowing a d-axis current value of the two-phase rotating coordinate system to be zero on the basis of the q-axis current value calculated in the fourth step and the rotation speed of the rotor acquired in the second step, and an eighth step (S9) of generating a drive control signal for controlling drive of the motor, by performing a space vector conversion based on an angle obtained by adding the lead angle value calculated in the seventh step and the rotation angle of the rotor, and the voltage command value calculated in the sixth step.

2. Specific Examples of Embodiment

Below, specific examples of the embodiment of the present invention will be described with reference to the drawings. Note that, in the following description, constituent elements common to each of the embodiments are denoted with the same reference symbols and will not be described repeatedly.

Figure 1:
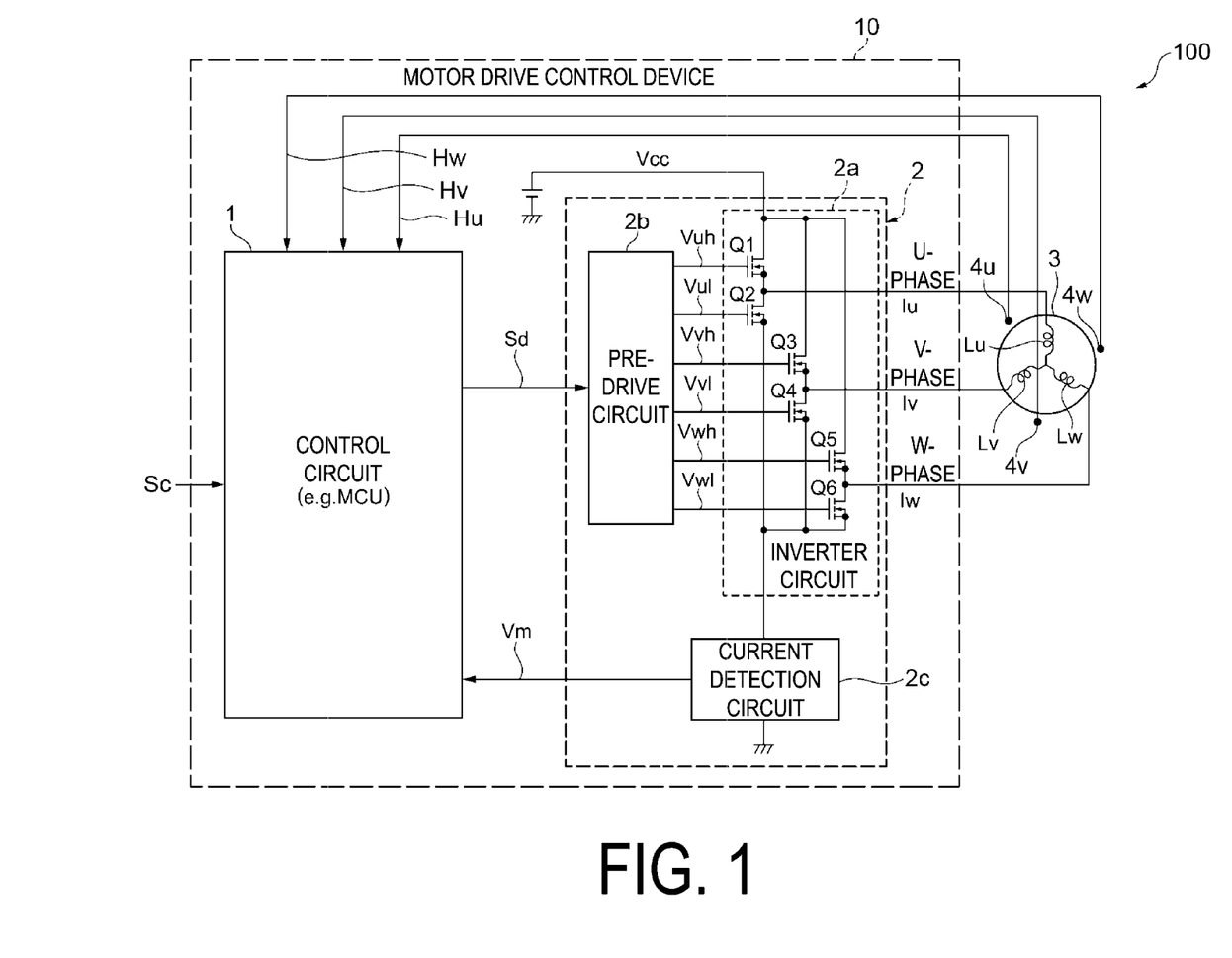
FIG. 1 is a diagram illustrating a configuration of a motor unit including a motor drive control device according to the present embodiment.

FIG. 1 is a diagram illustrating a configuration of a motor unit 100 including a motor drive control device 10 according to the present embodiment.

As illustrated in FIG. 1, the motor unit 100 includes a motor 3, a rotation position detector 4 (4u, 4v, and 4w) configured to detect a rotation position of the motor 3, and a motor drive control device 10 configured to control rotation of the motor 3. The motor unit 100 can be employed in various devices that use a motor as a drive source, such as a fan.

The motor 3 is a brushless motor, for example. In the present embodiment, the motor 3 is, for example, a surface permanent magnet synchronous motor (SPMSM) including coils Lu, Lv, and Lw in three phases. The coils Lu, Lv, and Lw are Y-connected to each other, for example.

Figure 3A:
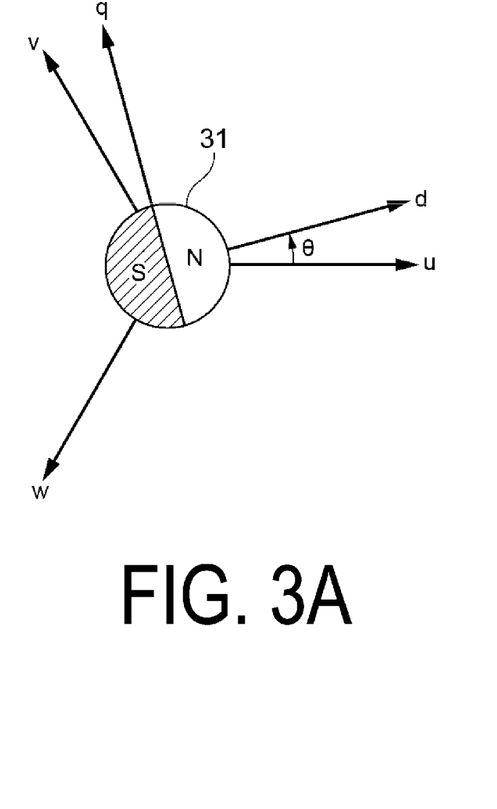
FIG. 3A is a diagram illustrating a relationship between a three-phase (U, V, W) fixed coordinate system and a two-phase (d, q) rotating coordinate system.

For example, the motor drive control device 10 applies a sine wave drive signal to the motor 3 to cause a drive current having a sine wave form to periodically flow through the coils Lu, Lv, and Lw in the three phases of the motor 3 to rotate the rotor 31 of the motor 3 (see FIG. 3A).

The motor drive control device 10 includes a control circuit 1 and a drive circuit 2. Note that not all of the constituent elements of the motor drive control device 10 are illustrated in FIG. 1, and that the motor drive control device 10 may include other constituent elements in addition to those illustrated in FIG. 1.

The drive circuit 2 drives the motor 3 on the basis of a drive control signal Sd output from the control circuit 1 described later. The drive circuit 2 includes an inverter circuit 2a and a pre-drive circuit 2b.

The inverter circuit 2a is a circuit arranged between a DC power supply Vcc and a ground potential and is configured to drive the coils Lu, Lv, and Lw of the motor 3 serving as a load on the basis of an input drive control signal Sd. Specifically, the inverter circuit 2a includes three switching legs including two drive transistors connected in series, and the two drive transistors alternately perform an on/off operation (switching operation) on the basis of the input drive control signal Sd to drive the motor 3 serving as a load.

More specifically, the inverter circuit 2a includes switching legs corresponding to each of the U-phase, the V-phase, and the W-phase of the motor 3. As illustrated in FIG. 1, the switching legs corresponding to each of the phases include two drive transistors Q1 and Q2, Q3 and Q4, and Q5 and Q6 connected in series between the DC power supply Vcc and the ground potential via the current detection circuit 2c.

Here, the drive transistors Q1, Q3, and Q5 are P-channel MOSFETs, for example, and the drive transistors Q2, Q4, and Q6 are N-channel MOSFETs, for example. Note that the drive transistors Q1 to Q6 may be other types of power transistors such as an insulated gate bipolar transistor (IGBT).

For example, the switching leg corresponding to the U-phase includes the drive transistors Q1 and Q2 connected in series with each other. The point connected commonly with the drive transistor Q1 and the drive transistor Q2 is connected to one end of the coil Lu serving as a load. The switching leg corresponding to the V-phase includes the drive transistors Q3 and Q4 connected in series with each other. The point connected commonly with the drive transistor Q3 and the drive transistor Q4 is connected to one end of the coil Lv serving as a load. The switching leg corresponding to the W-phase includes the drive transistors Q5 and Q6 connected in series with each other. The point commonly connected with the drive transistor Q5 and the drive transistor Q6 is connected to one end of the coil Lw serving as a load.

Based on the drive control signal Sd output from the control circuit 1, the pre-drive circuit 2b generates a drive signal for driving the inverter circuit 2a.

The drive control signal Sd is a signal used for controlling the drive of the motor 3 and is a pulse width modulation (PWM) signal, for example. Specifically, the drive control signal Sd is a signal used for switching a current flowing pattern of the coils Lu, Lv, and Lw of the motor 3 determined by an on/off state of individual switch elements constituting the inverter circuit 2a. More specifically, the drive control signal Sd includes six types of PWM signals individually corresponding to the drive transistors Q1 to Q6 of the inverter circuit 2a.

Based on the six types of PWM signals serving as the drive control signal Sd supplied from the control circuit 1, the pre-drive circuit 2b generates six types of drive signals Vuu, Vul, Vvu, Vvl, Vwu, and Vwl capable of supplying sufficient power for driving control electrodes (gate electrodes) of each of the drive transistors Q1 to Q6 of the inverter circuit 2a.

When these drive signals Vuu, Vul, Vvu, Vvl, Vwu, and Vwl are input to the control electrodes (gate electrodes) of each of the drive transistors Q1 to Q6 of the inverter circuit 2a, each of the drive transistors Q1 to Q6 performs an on/off operation (switching operation). For example, the drive transistors Q1, Q3, and Q5 on an upper arm and the drive transistors Q2, Q4, and Q6 on a lower arm of the switching legs corresponding to each of the phases alternately perform an on/off operation. Thus, the DC power supply Vcc supplies power to each of the phases of the motor 3 to rotate the motor 3.

The current detection circuit 2c is a circuit for detecting drive currents of the coils Lu, Lv, and Lw of the motor 3. The current detection circuit 2c includes a resistor (shunt resistor) as a current detection element, for example. The resistor is connected in series with the inverter circuit 2a between the DC power supply Vcc and the ground potential, for example. In the present embodiment, the resistor as the current detection circuit 2c is connected to a negative side (ground side) of the inverter circuit 2a, for example. The current detection circuit 2c converts a current flowing through the coils Lu, Lv, and Lw of the motor 3 into a voltage by the resistor mentioned above, and inputs the voltage as a current detection signal Vm to the control circuit 1.

The rotation position detector 4 is a device configured to detect a rotation position of the rotor 31 of the motor 3. The rotation position detector 4 is a Hall element, for example. FIG. 1 illustrates an example where Hall elements are provided as the rotation position detectors 4u, 4v, and 4w for each of the U-phase, the V-phase, and the W-phase of the motor 3. Hereinafter, the rotation position detectors 4u, 4v, and 4w are also referred to as "Hall elements 4u, 4v, and 4w".

For example, the Hall elements 4u, 4v, and 4w are arranged around the rotor (rotating element) 31 of the motor 3 at substantially equal intervals (for example, at equal intervals of 120 degrees, respectively). The Hall elements 4u, 4v, and 4w each detect a magnetic pole of the rotor 31 and output Hall signals having a voltage that fluctuates in accordance with the rotation of the rotor 31, as rotation position detection signals Hu, Hv, and Hw. The rotation position detection signals Hu, Hv, and Hw are input to the control circuit 1.

Note that the control circuit 1 may be configured to receive, instead of the Hall signal, another signal corresponding to the rotation position of the rotor 31 of the motor 3 as the rotation position detection signal. For example, an encoder or a resolver may be provided and a detection signal of the encoder or the resolver may be input into the control circuit 1.

For example, based on a drive command signal Sc being input from the outside and indicating a target state of operation of the motor 3, the control circuit 1 generates the drive control signal Sd for driving the motor 3, to control drive of the motor 3. Based on the current detection signal Vm from the current detection circuit 2c and the rotation position detection signals Hu, Hv, and Hw from the rotation position detectors 4u, 4v, and 4w, the control circuit 1 obtains information such as rotation speed and torque of the rotor 31 of the motor 3 to monitor a rotation state of the motor 3, and generates the drive control signal Sd so that the motor 3 enters an operation state specified by the drive command signal Sc, and applies the generated drive control signal Sd to the drive circuit 2.

In the present embodiment, the control circuit 1 is a program processing device (for example, a microcontroller) having a configuration where a processor such as a CPU, various types of storage devices such as a RAM and a ROM, and a peripheral circuit such as a counter (timer), an A/D conversion circuit, a D/A conversion circuit, a clock generation circuit, and an input/output I/F circuit are connected with each other via a bus or a dedicated line, for example.

Note that the motor drive control device 10 may be configured to include a single integrated circuit device (IC) package containing at least a part of the control circuit 1 and at least a part of the drive circuit 2, or configured to include separate integrated circuit device packages each containing one of the control circuit 1 and the drive circuit 2.

In order to maximize the drive efficiency of the motor 3, the control circuit 1 calculates the d-axis current value and controls a lead angle so that a d-axis current value Id is zero, instead of performing vector control so that the d-axis current value is zero as in the related art, to generate the drive control signal Sd. Below, a method of generating the drive control signal Sd by the control circuit 1 will be described in detail.

Figure 2:
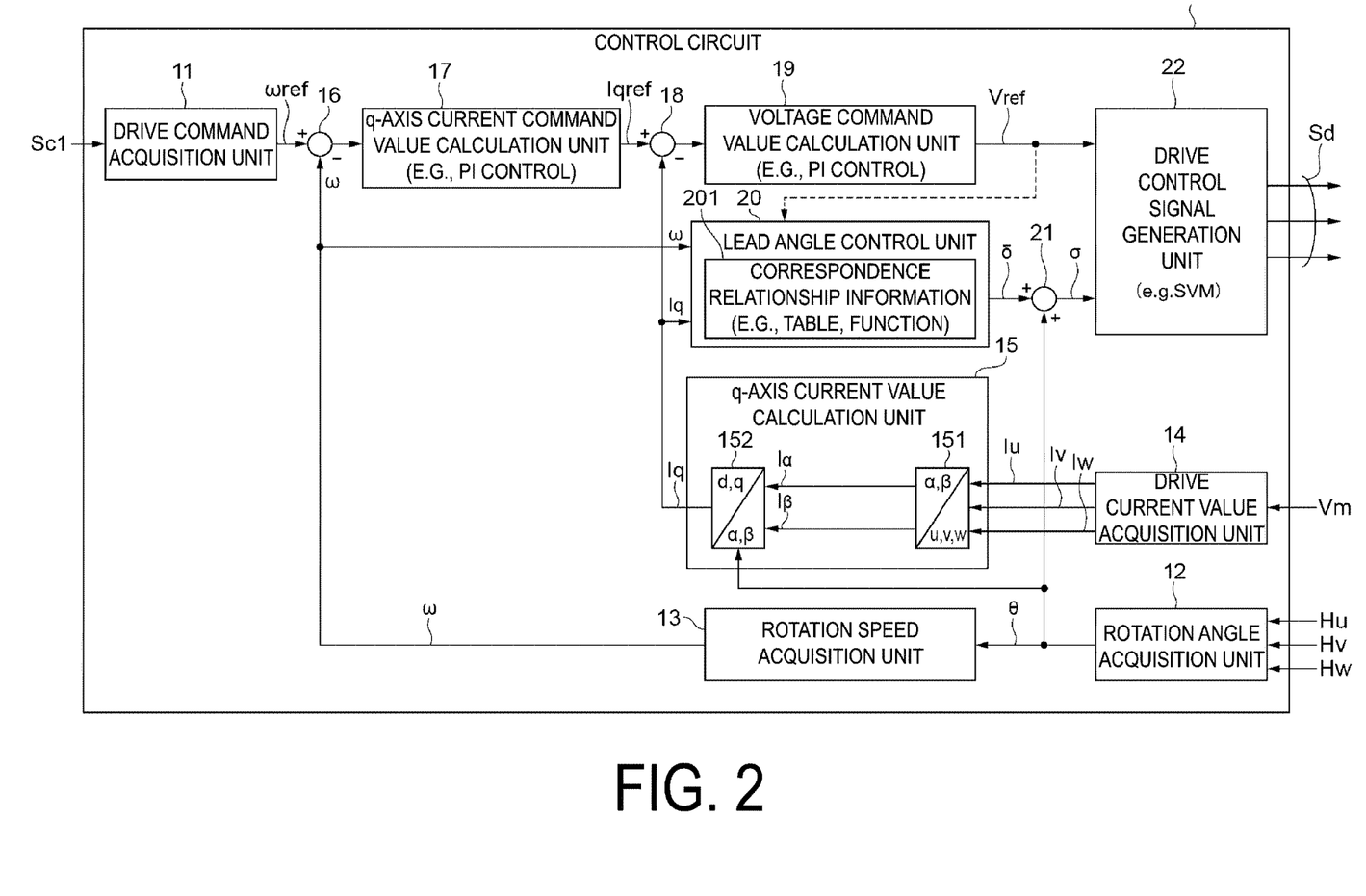
FIG. 2 is a diagram illustrating a functional block configuration of a control circuit in the motor drive control device according to the present embodiment.

FIG. 2 is a diagram illustrating a functional block configuration of the control circuit 1 in the motor drive control device 10 according to the present embodiment.

As illustrated in FIG. 2, the control circuit 1 includes, as functional blocks for controlling the lead angle to generate the drive control signal Sd, a drive command acquisition unit 11, a rotation angle acquisition unit 12, a rotation speed acquisition unit 13, a drive current value acquisition unit 14, a q-axis current value calculation unit 15, error calculation units 16 and 18, a q-axis current command value calculation unit 17, a voltage command value calculation unit 19, a lead angle control unit 20, an addition unit 21, and a drive control signal generation unit 22.

In a program processing device functioning as the control circuit 1, these functional blocks are achieved, for example, by a processor executing various types of arithmetic processes in accordance with a program stored in a memory, and controlling a peripheral circuit such as a counter or an A/D conversion circuit.

The drive command acquisition unit 11 receives the drive command signal Sc from the outside, and analyzes the received drive command signal Sc to acquire a value defining a target operation state of the motor 3 specified by the drive command signal Sc.

The drive command signal Sc includes a value indicating a target state of an operation of the motor 3. The drive command signal Sc is, for example, a signal output from a host device configured to control the motor unit 100. The host device is provided outside the motor drive control device 10.

In the present embodiment, the drive command signal Sc is, for example, a speed command signal Sc1 for specifying the rotation speed of the rotor 31 of the motor 3. The drive command signal Sc includes a value $\omega$ref of a targeted rotation speed (target rotation speed) of the rotor 31 of the motor 3. Hereinafter, in the present embodiment, description is given under the assumption that the drive command signal Sc is the speed command signal Sc1.

The speed command signal Sc1 is, for example, a PWM signal having a duty ratio according to a specified target rotation speed $\omega$ref. For example, the drive command acquisition unit 11 measures the duty ratio of the PWM signal as the speed command signal Sc1, and outputs, as the target rotation speed $\omega$ref, a rotation speed according to the measured duty ratio.

The rotation angle acquisition unit 12 is a functional unit configured to acquire a measurement value of the rotation angle of the rotor 31 of the motor 3. For example, the rotation angle acquisition unit 12 calculates a rotation angle (rotation position) $\theta$ of the rotor 31 of the motor 3 on the basis of the rotation position detection signals Hu, Hv, and Hw output from the rotation position detectors 4u, 4v, and 4w, respectively.

Note that, when the motor drive control device 10 does not include the rotation position detectors 4u, 4v, and 4w (in a case of a sensorless method), the rotation angle acquisition unit 12 may calculate the rotation angle $\theta$ of the motor 3 by a known arithmetic operation used in a position sensorless method.

In the present embodiment, the rotation speed acquisition unit 13 is a functional unit configured to acquire a measurement value of the rotation speed of the rotor 31 of the motor 3. For example, the rotation speed acquisition unit 13 calculates a rotation speed $\omega$ of the rotor 31 of the motor 3 on the basis of the rotation angle $\theta$ calculated by the rotation angle acquisition unit 12.

The drive current value acquisition unit 14 is a functional unit configured to acquire measurement values of drive current values Iu, Iv, and Iw of the coils Lu, Lv, and Lw of the motor 3. The drive current value acquisition unit 14 calculates, for example, each of a measurement value of the current flowing through the U-phase coil Lu (the drive current value Iu), a measurement value of the current flowing through the V-phase coil Lv (the drive current value Iv), and a measurement value of the current flowing through the W-phase coil Lw (the drive current value Iw) on the basis of the current detection signal Vm output from the current detection circuit 2c.

The q-axis current value calculation unit 15 is a functional unit configured to calculate a q-axis current value Iq of a rotating coordinate system on the basis of the drive current values (phase currents) Iu, Iv, and Iw of each phase acquired by the drive current value acquisition unit 14, and the rotation angle θ of the rotor 31 acquired by the rotation angle acquisition unit 12.

Specifically, the q-axis current value calculation unit 15 includes a Clarke transform unit 151 and a Park transform unit 152. The Clarke transform unit 151 applies Clarke transformation to the drive current values Iu, Iv, and Iw, of a three-phase (U, V, W) fixed coordinate system, acquired by the drive current value acquisition unit 14 to calculate currents Iα and Iβ of a two-phase Cartesian coordinate (fixed coordinate) system (α, β). The Park transform unit 152 applies Park transformation to the currents Iα and Iβ of the two-phase fixed coordinate system, by using the rotation angle θ (sin θ and cos θ) acquired by the rotation angle acquisition unit 12 to calculate the q-axis current value Iq of the two-phase (d, q) rotating coordinate system. The q-axis current value Iq is a value of a current (torque current) corresponding to the torque of the motor 3.

Note that, in the motor drive control device 10 according to the present embodiment, the Park transform unit 152 may not generate the d-axis current value Id.

The error calculation unit 16 is a functional unit configured to calculate a difference (ωref−ω) between the target rotation speed ωref output from the drive command acquisition unit 11 and the actual rotation speed ω of the motor 3 acquired by the rotation speed acquisition unit 13.

The q-axis current command value calculation unit 17 is a functional unit configured to calculate a q-axis current command value Iqref to reduce the difference between the target rotation speed ωref and the rotation speed ω of the motor 3. For example, the q-axis current command value calculation unit 17 calculates, by a PI control arithmetic operation, the q-axis current command value Iqref being a control amount of the motor 3 so that the error (ωref−ω) calculated by the error calculation unit 16 is zero.

The error calculation unit 18 is a functional unit configured to calculate the difference (Iqref−Iq) between the q-axis current command value Iqref calculated by the q-axis current command value calculation unit 17 and the q-axis current value Iq calculated by the q-axis current value calculation unit 15.

The voltage command value calculation unit 19 is a functional unit configured to calculate a voltage command value Vref of a rotating coordinate system (d, q) to reduce the difference between the q-axis current command value Iqref calculated by the q-axis current command value calculation unit 17 and the q-axis current value Iq calculated by the q-axis current value calculation unit 15. For example, the voltage command value calculation unit 19 calculates, by a PI control arithmetic operation, the voltage command value Vref being the control amount of the motor 3, so that the error (Iqref−Iq) calculated by the error calculation unit 18 is zero.

The lead angle control unit 20 is a functional unit configured to control the lead angle of the motor 3.

The lead angle control unit 20 calculates a phase lead angle (a lead angle value $\phi$) of a voltage applied to each of the coils Lu, Lv, and Lw (a phase applied voltage) on the basis of the q-axis current value Iq calculated by the q-axis current value calculation unit 15 and the rotation speed ω of the rotor 31 acquired by the rotation speed acquisition unit 13. Specifically, the lead angle control unit 20 calculates a lead angle value δ allowing the d-axis current value Id of the rotating coordinate system (d, q) to be zero. Below, a method of calculating the lead angle value δ according to the present embodiment will be described in detail.

FIG. 3A is a diagram illustrating a relationship between a three-phase (U, V, W) fixed coordinate system and a two-phase (d, q) rotating coordinate system.

As illustrated in FIG. 3A, in vector control, generally the d-axis in the two-phase (d, q) rotating coordinate system runs along a magnetic flux (N pole) direction of a magnet (permanent magnet) of the rotor (rotating element) 31 of the motor 3, and the q-axis runs along a direction advanced by 90 degrees in a forward direction from the d-axis. In this case, the rotation angle θ of the rotor 31 measured by the rotation angle acquisition unit 12 is the rotation angle of the d-axis, and is, for example, an angle formed by the u-axis in the three-phase (U, V, W) fixed coordinate system and the d-axis.

Figure 3B:
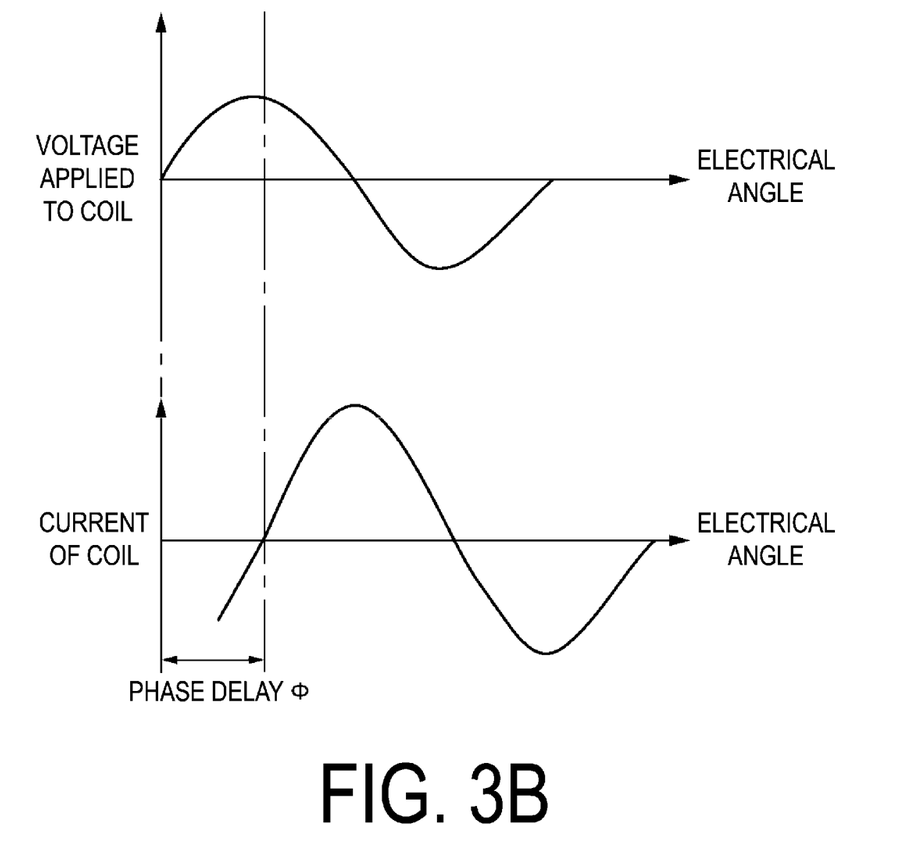
FIG. 3B is a chart for explaining a current delay with respect to a voltage applied to a coil of a motor.

FIG. 3B is a chart for explaining a current delay with respect to a voltage applied to a coil of a motor.

Generally, when a voltage is applied to the coil of a motor, a phase of the current of the coil is delayed with respect to the applied voltage due to the inductance of the coil. Therefore, in typical lead angle control, the phase of the applied voltage is advanced by a phase delay $\phi$ of the current of the coil with respect to the applied voltage to perform control so that the current is in a desired phase. The lead angle of the phase of the applied voltage in this case is referred to as the lead angle value $\phi$.

As described above, in the surface permanent magnet synchronous motor (SPMSM), the d-axis inductance Ld and the q-axis inductance Lq are equal (Ld=Lq), and thus, the motor efficiency is at a maximum when the d-axis current value Id is zero. It is only required to advance the phase of the applied voltage by the lead angle value $\phi$ with respect to the q-axis so that the d-axis current value Id is zero, that is, the current includes only a q-axis component.

Thus, the motor drive control device 10 according to the present embodiment calculates the lead angle value $\phi$ allowing the d-axis current value Id of the rotating coordinate system to be zero and performs a space vector conversion based on information about polar coordinates expressed by the lead angle value $\phi$ and the voltage command value Vref of the rotating coordinate system to generate the drive control signal Sd.

Figure 4:
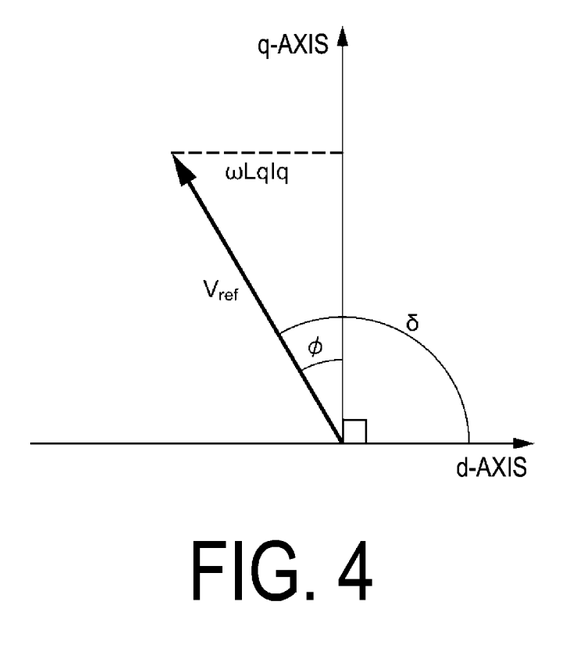
FIG. 4 is a diagram for explaining a method of calculating a lead angle value.

FIG. 4 is a diagram for explaining a method of calculating a lead angle value.

In FIG. 4, the voltage command value Vref (vector) when the horizontal axis is the d-axis and the vertical axis is the q-axis is illustrated.

Generally, a d-axis voltage value Vd of a permanent magnet synchronous motor (PMSM) in a two-phase (d, q) rotating coordinate system is expressed by Equation (2) below.

$$V_d = RI_d + L_d \frac{d}{dx} I_d - \omega L_q I_q \quad (2)$$

Here, from Equation (2) above, the d-axis voltage value Vd obtained when the d-axis current value Id is 0 can be expressed by Equation (3) below.

[Math. 3]

$$V_d = -\omega L_q I_q \quad (3)$$

Therefore, if the lead angle is controlled to determine the lead angle value φ so that a d-axis direction component of the vector of the voltage command value Vref is "−ωLqIq", it is possible to control the drive of the motor 3 so that the d-axis current value Id is zero.

As illustrated in FIG. 4, when an angle formed by the vector of the voltage command value Vref and the q-axis is φ, Equation (4) below is obtained from Equation (3).

[Math. 4]

$$V_{ref} \sin \phi = -V_d = \omega L_g I_q \quad (4)$$

From Equation (4) above, the lead angle value φ obtained when the d-axis current value Id is zero is expressed by Equation (5) below.

[Math. 5]

$$\phi = \sin^{-1} \frac{\omega L_q I_q}{V_{ref}} \quad (5)$$

In the motor drive control device 10 according to the present embodiment, the lead angle control unit 20 calculates the lead angle value φ so that the d-axis current value Id of the two-phase (d, q) rotating coordinate system is zero on the basis of the q-axis current value Iq calculated by the q-axis current value calculation unit 15 and the rotation speed ω of the rotor 31 acquired by the rotation speed acquisition unit 13.

Specifically, the lead angle control unit 20 calculates an angle (the lead angle value) φ of the vector of the voltage command value Vref with respect to the q-axis, when a component of the vector of the voltage command value Vref in the d-axis direction coincides with the d-axis voltage value Vd at the time of the d-axis current value Id being zero.

Here, the rotation angle θ of the rotor 31 of the motor 3 is a rotation angle with respect to the d-axis. On the other hand, as illustrated in FIG. 4, the lead angle value φ is an angle of the vector of the voltage command value Vref with respect to the q-axis. Therefore, the lead angle value δ with respect to the d-axis is "φ+π/2". The lead angle control unit 20 calculates and outputs the lead angle value δ (=φ+π/2).

Specifically, the lead angle control unit 20 calculates the lead angle value δ by using correspondence relationship information 201 indicating a correspondence relationship among the rotation speed ω of the rotor 31, the q-axis current value Iq, and the lead angle value δ (φ). The following methods are examples of methods of calculating the lead angle value δ by using the correspondence relationship information 201.

In a first method, the lead angle control unit 20 includes, as the correspondence relationship information 201, a function of the lead angle value φ expressed by Equation (5), and may calculate the lead angle value φ on the basis of Equation (5). For example, the function of the angle φ expressed by Equation (5) is stored in advance in the memory in the control circuit 1, as the correspondence relationship information 201. The lead angle control unit 20 reads out Equation (5) as the correspondence relationship information 201 from the memory, and substitutes the q-axis current value Iq calculated by the q-axis current value calculation unit 15 and the rotation speed ω of the rotor 31 acquired by the rotation speed acquisition unit 13 into Equation (5) to calculate an angle φ allowing the d-axis current value Id to be zero. Subsequently, the lead angle control unit 20 outputs a value obtained by adding π/2 to the calculated angle φ, as the lead angle value δ with respect to the d-axis.

In Equation (5), the q-axis inductance Lq is a fixed value. Therefore, the lead angle control unit 20 can use, for example, a value stored in advance in the memory of the control circuit 1 as the q-axis inductance Lq in the arithmetic operation using Equation (5) above. Furthermore, the lead angle control unit 20 can use the value calculated by the voltage command value calculation unit 19 as the voltage command value Vref in the arithmetic operation using Equation (5) above.

Note that the voltage command value Vref can be calculated from the q-axis current value Iq and the rotation speed ω, and thus, the lead angle control unit 20 may calculate the value of the voltage command value Vref by using the q-axis current value Iq and the rotation speed ω, without acquiring the value of the voltage command value Vref from the voltage command value calculation unit 19.

In a second method, the lead angle control unit 20 includes, as the correspondence relationship information 201, a table having the lead angle value δ associated with each of combinations of the rotation speed ω and the q-axis current value Iq, and may calculate the lead angle value φ on the basis of the table.

Figure 5:
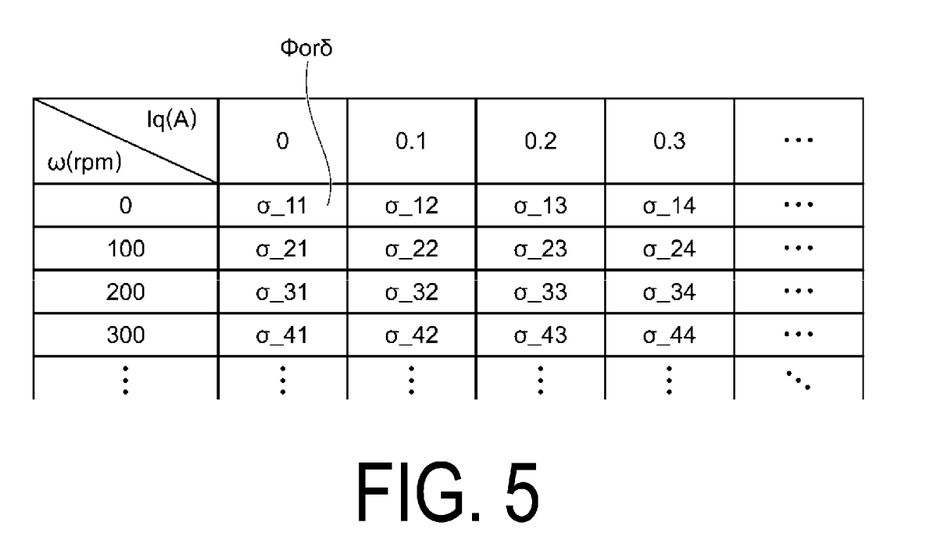
FIG. 5 is an example of a table as correspondence relationship information 201 with a lead angle value δ associated with each of combinations of a rotation speed ω and a q-axis current value Iq.

FIG. 5 is an example of a table as the correspondence relationship information 201 with the lead angle value δ associated with each of combinations of the rotation speed ω and the q-axis current value Iq.

As described above, the q-axis inductance Lq is a fixed value, and the voltage command value Vref can be calculated from the q-axis current value Iq and the rotation speed ω. Therefore, the lead angle value δ is calculated in advance by using Equation (5) above with the rotation speed ω of the rotor 31 and the q-axis current value Iq as variables. Subsequently, a table having the lead angle value δ associated with each of the combinations of the rotation speed ω and the q-axis current value Iq as variables is created, and is stored in advance in the memory of the control circuit 1 as the correspondence relationship information 201.

The lead angle control unit 20 uses the q-axis current value Iq calculated by the q-axis current value calculation unit 15 and the rotation speed ω of the rotor 31 acquired by the rotation angle acquisition unit 13 as arguments and refers to the table being the correspondence relationship information 201 to read out the lead angle value δ corresponding to these arguments from the table to output the lead angle value δ.

The lead angle value δ calculated by the above-described methods is input to the addition unit 21. The addition unit 21 adds the lead angle value δ output from the lead angle control unit 20 and the rotation angle θ of the rotor 31 acquired by the rotation angle acquisition unit 12 and outputs the added value as information about an angle σ (=θ+δ) of the vector of the voltage command value Vref.

The drive control signal generation unit 22 is a functional unit configured to generate the drive control signal Sd on the basis of the angle σ obtained by adding the lead angle value δ and the rotation angle θ of the rotor 31 and the voltage command value Vref. The drive control signal generation unit 22 performs a space vector conversion on the basis of information about polar coordinates expressed by the voltage command value Vref output from the voltage command value calculation unit 19 and the angle σ (=θ+δ) output from the addition unit 21. That is, the drive control signal generation unit 22 converts a voltage vector expressed by the voltage command value Vref and a polar coordinate value of the angle σ (θ+δ) into a voltage signal (PWM signal) of a three-phase (U, V, W) fixed coordinate system by using a known space vector conversion arithmetic method, and outputs the converted signal as the drive control signal Sd.

Next, the flow of a process for generating the drive control signal Sd by the motor drive control device 10 will be described.

Figure 6:
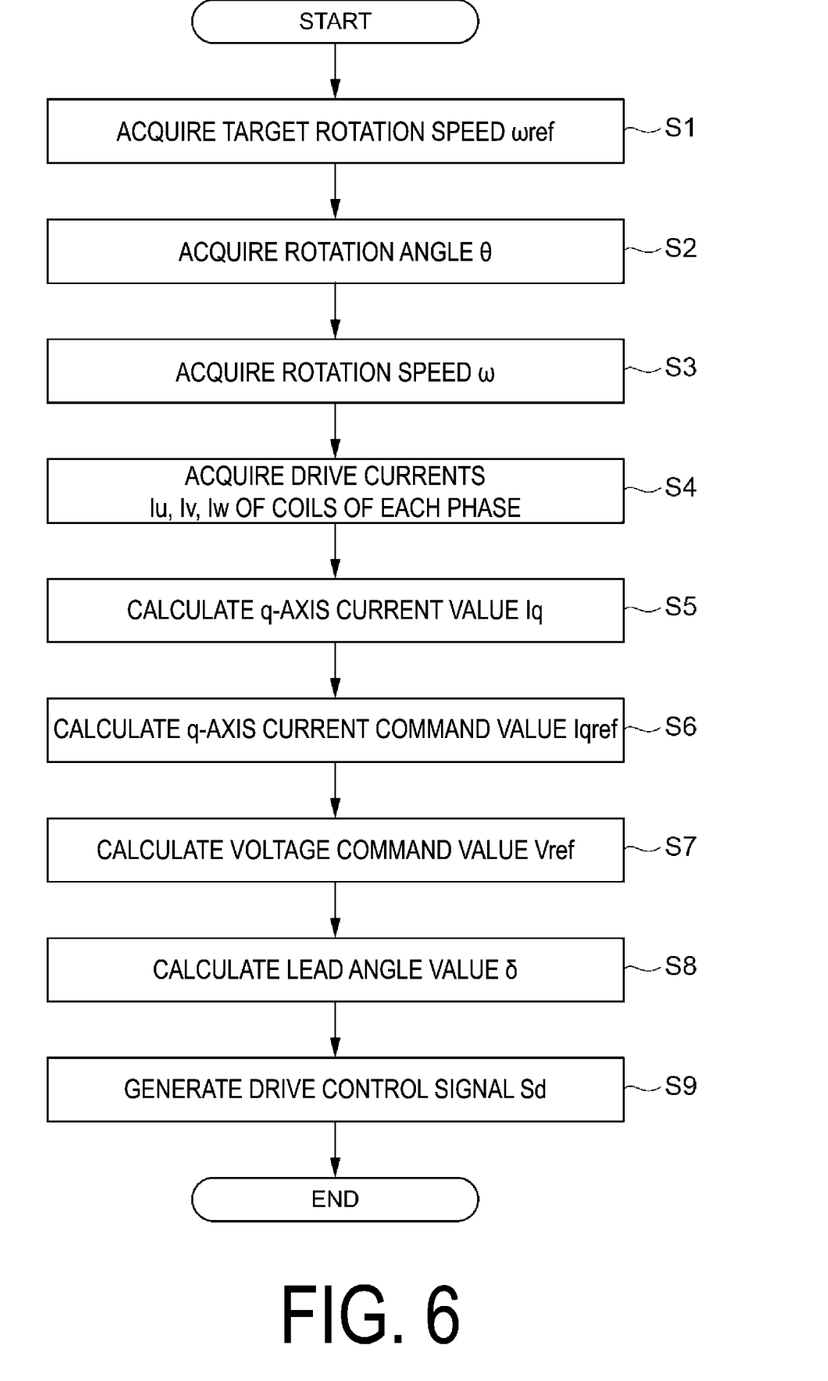
FIG. 6 is a flowchart illustrating an example of the flow of a process for generating a drive control signal by the motor drive control device according to the present embodiment.

FIG. 6 is a flowchart illustrating an example of the flow of the process for generating the drive control signal Sd by the motor drive control device 10 according to the present embodiment.

First, when the speed command signal Sc1 is input from a host device, for example, the control circuit 1 analyzes the speed command signal Sc1 to acquire information about the target rotation speed ωref of the motor 3 specified by the speed command signal Sc1 (step S1).

Next, the control circuit 1 acquires the rotation angle θ of the rotor 31 of the motor 3 (step S2). Specifically, as described above, the rotation angle acquisition unit 12 calculates the rotation angle θ of the rotor 31 of the motor 3 on the basis of the rotation position detection signals Hu, Hv, and Hw output from the Hall elements 4u, 4v, and 4w serving as rotation position detectors.

Furthermore, the control circuit 1 acquires the rotation speed ω of the motor 3 (step S3). Specifically, as described above, the rotation speed acquisition unit 13 calculates the rotation speed ω of the rotor 31 of the motor 3 on the basis of the rotation angle θ of the rotor 31 calculated in step S2.

Furthermore, the control circuit 1 acquires the drive current values Iu, Iv, and Iw of the respective coils Lu, Lv, and Lw of the phases of the motor 3 (step S4). Specifically, as described above, the drive current value acquisition unit 14 calculates the drive current values Iu, Iv, and Iw of the respective coils of the phases on the basis of the current detection signal Vm output from the current detection circuit 2c.

Next, the control circuit 1 calculates the q-axis current value Iq of the two-phase (d, q) rotating coordinate system on the basis of the drive current values Iu, Iv, and Iw of the coils of the phases acquired in step S4 and the rotation angle θ of the rotor 31 acquired in step S2 (step S5). Specifically, as described above, the q-axis current value calculation unit 15 applies Clarke transformation and Park transformation to the drive current values Iu, Iv, and Iw of the three-phase (U, V, W) fixed coordinate system to calculate the q-axis current value Iq of the two-phase (d, q) rotating coordinate system.

Subsequently, the control circuit 1 calculates the q-axis current command value Iqref to reduce the difference between the target rotation speed ωref of the motor 3 and the rotation speed ω of the rotor 31 acquired in step S3 (step S6). Specifically, as described above, the control circuit 1 calculates the difference between the target rotation speed ωref and the actual rotation speed ω of the motor 3 by the error calculation unit 16, and the q-axis current command value calculation unit 17 performs a PI control arithmetic operation so that the difference calculated by the error calculation unit 16 is zero, to calculate the q-axis current command value Iqref.

Next, the control circuit 1 calculates the voltage command value Vref of the two-phase (d, q) rotating coordinate system to reduce the difference between the q-axis current command value Iqref calculated in step S6 and the q-axis current value Iq calculated in step S5 (step S7). Specifically, as described above, the error calculation unit 18 calculates the difference between the q-axis current command value Iqref and the actual q-axis current value Iq of the motor 3, and the q-axis current command value calculation unit 17 performs a PI control arithmetic operation so that the difference calculated by the error calculation unit 18 is zero, to calculate the voltage command value Vref.

Subsequently, the control circuit 1 calculates the lead angle value δ allowing the d-axis current value Id to be zero on the basis of the q-axis current value Iq calculated in step S5 and the rotation speed ω of the rotor 31 acquired in step S3 (step S8). Specifically, the lead angle control unit 20 calculates the lead angle value δ by the above-mentioned methods using the correspondence relationship information 201.

Next, the control circuit 1 generates the drive control signal Sd on the basis of the angle σ obtained by adding the lead angle value δ calculated in step S8 and the rotation angle θ of the rotor 31, and the voltage command value Vref calculated in step S7 (step S9). Specifically, as described above, the drive control signal generation unit 22 converts a voltage vector expressed by the voltage command value Vref and the polar coordinate value of the angle σ (θ+δ) into a voltage signal (PWM signal) of a three-phase (U, V, W) fixed coordinate system by using a known space vector conversion arithmetic method, and outputs the converted signal as the drive control signal Sd.

The drive control signal Sd generated by the processing procedure described above is supplied to the drive circuit 2. The drive circuit 2 controls the energization of the coil of the motor 3 by the method described above on the basis of the input drive control signal Sd. Thus, the motor 3 is controlled to rotate at the target rotation speed ωref specified by the speed command signal Sc1.

As described above, in order to maximize the efficiency of the motor 3, the motor drive control device 10 according to the present embodiment controls the lead angle so that the d-axis current value Id is zero, to drive the motor 3. Thus, it is possible to reduce the arithmetic load, compared to a case of calculating the d-axis current value Id and performing a vector control arithmetic operation so that the calculated d-axis current value Id is zero as in the related art.

Figure 7:
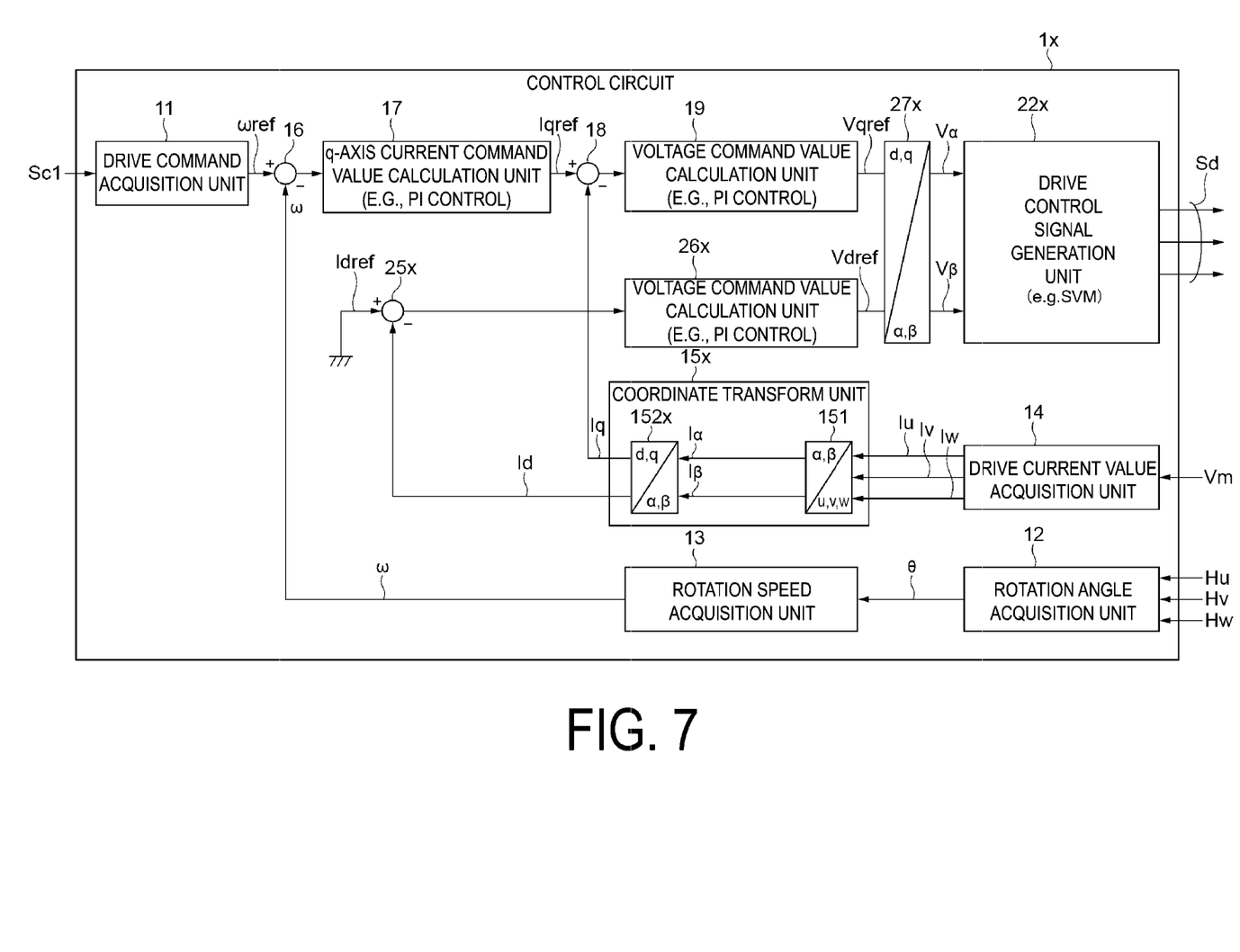
FIG. 7 is a diagram illustrating an example of a configuration of a control circuit configured to perform a conventional vector control arithmetic operation, as a Comparative Example of the control circuit according to the present embodiment.

FIG. 7 is a diagram illustrating an example of a configuration of a control circuit configured to perform a conventional vector control arithmetic operation, as a Comparative Example of the control circuit 1 according to the present embodiment.

As illustrated in FIG. 7, a control circuit 1x according to the related art performs the following arithmetic operation for vector control so that the d-axis current value Id is zero.

Specifically, the control circuit 1x calculates not only the q-axis current value Iq but also the d-axis current value Id by using a coordinate transform unit 15x, and then calculates an error of the d-axis current obtained when the d-axis current command value Idref is zero, by using an error calculation unit 25x. Next, the control circuit 1x calculates a d-axis voltage command value Vdref on the basis of the error of the d-axis current, by using a voltage command value calculation unit 26x. Subsequently, the control circuit 1x applies inverse Park transformation to a q-axis voltage command value Vqref calculated by the voltage command value calculation unit 19 and the d-axis voltage command value Vdref calculated by the voltage command value calculation unit 26x, by using a coordinate transform unit 27x, to transform the voltage command value Vqref and the voltage command value Vdref into voltage command values Vα and Vβ of the two-phase (α, β) fixed coordinate system. Subsequently, the control circuit 1x performs a space vector conversion based on the voltage command values Vα and Vβ of Cartesian coordinates by using a drive control signal generation unit 22x, to generate the drive control signal Sd being a three-phase voltage signal (PWM signal).

Thus, when a conventional vector control arithmetic operation is performed so that the d-axis current value Id is zero, it is necessary to calculate the d-axis current value Id by using the coordinate transform unit 15x, calculate the error of the d-axis current value Id by using the error calculation unit 25x, calculate the voltage command value Vdref of the d-axis voltage by using the voltage command value calculation unit 26x, and apply inverse Park transformation by the coordinate transform unit 27x.

On the other hand, in the motor drive control device 10 according to the present embodiment, instead of performing the plurality of arithmetic processes described above included in a conventional vector control arithmetic operation allowing the d-axis current value to be zero, it is only required to perform an arithmetic process to calculate the lead angle value δ (σ), and thus, it is possible to significantly reduce the arithmetic load of the control circuit 1 (processor). Therefore, it is possible to reduce the processing capacity required for the program processing device (for example, a microcontroller) serving as the control circuit 1, and thus, the motor drive control device 10 can be provided at a lower cost.

Furthermore, in the motor drive control device 10, if the correspondence relationship information 201 indicating a correspondence relationship among the rotation speed ω of the rotor 31, the q-axis current value Iq, and the lead angle value δ is used in the calculation of the lead angle value δ (ϕ) so that the d-axis current value Id is zero, it is possible to further reduce the arithmetic load of the control circuit 1.

For example, as described above, if the function of the lead angle value ϕ expressed by Equation (5) is stored in advance as the correspondence relationship information 201 in the memory of the control circuit 1, and the q-axis current value Iq and the rotation speed ω are substituted in Equation (5) as parameters, it is possible to calculate the lead angle value δ without performing a complicated calculation.

Furthermore, as described above, for example, if a table having the lead angle value δ associated with each combination of the rotation speed ω of the rotor 31 and the q-axis current value Iq is stored in advance as the correspondence relationship information 201 in the memory of the control circuit 1, and data of the lead angle value δ is read out from the table, it is possible to calculate the lead angle value δ without performing a complicated calculation. Thus, the arithmetic load of the control circuit 1 can be further reduced.

Expansion of Embodiment

The invention contrived by the present inventors has been described in detail above with reference to the embodiment. However, the present invention is not limited to the embodiment, and various modifications can be made without departing from the gist of the present invention.

For example, in the above embodiment, a case where the drive command signal Sc is the speed command signal Sc1 including a target value of the rotation speed (target rotation speed) of the motor 3 is described in an example, but the embodiment is not limited to this case. For example, the drive command signal Sc may be a torque command signal Sc2 for specifying torque of the motor 3.

Below, another example of a control circuit in a case of the torque command signal Sc2 as the drive command signal Sc being input to a motor drive control device will be described.

Figure 8:
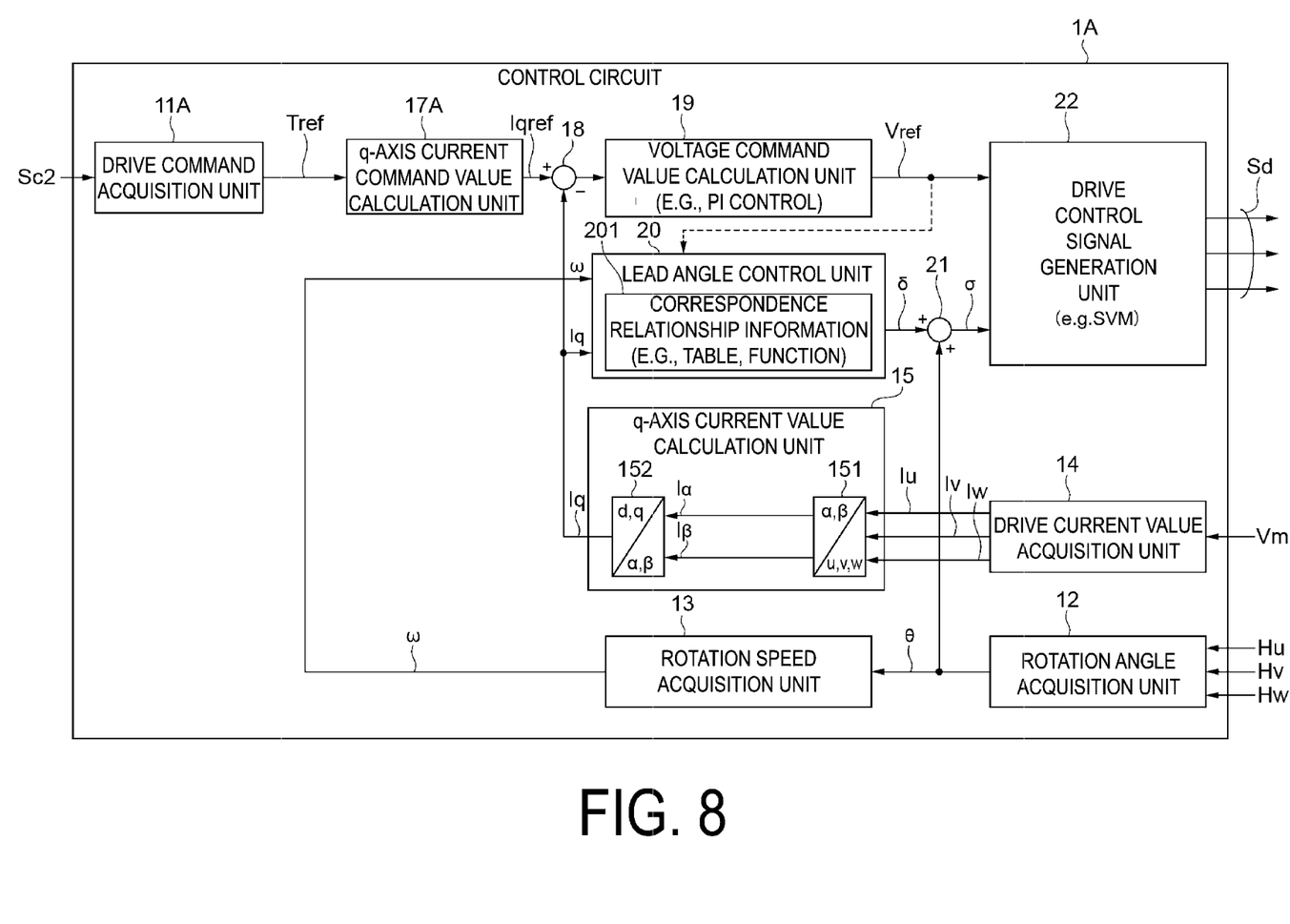
FIG. 8 is a diagram illustrating a functional block configuration of a control circuit in a motor drive control device according to another embodiment of the present invention.

FIG. 8 is a diagram illustrating a functional block configuration of a control circuit in a motor drive control device according to another embodiment of the present invention.

A control circuit 1A illustrated in FIG. 6 is the same as the control circuit 1, except that, instead of the drive command acquisition unit 11 and the q-axis current command value calculation unit 17, a drive command acquisition unit 11A and a q-axis current command value calculation unit 17A are provided.

The torque command signal Sc2 for specifying the torque of the motor 3 is input to the control circuit 1A as the drive command signal Sc. Here, the torque command signal Sc2 includes a torque command value Tref indicating a target value of the torque of the motor 3.

The drive command acquisition unit 11A receives the torque command signal Sc2 from the outside. The drive command acquisition unit 11A acquires and outputs the torque command value Tref included in the received torque command signal Sc2.

The q-axis current command value calculation unit 17A calculates the q-axis current command value Iqref on the basis of the torque command value Tref output from the drive command acquisition unit 11A. For example, without performing PI control, the q-axis current command value calculation unit 17A multiplies the torque command value Tref by "1/(P*ψ)" determined when Id=0 in Equation (1) above, to calculate the q-axis current command value Iqref.

The q-axis current command value Iqref calculated by the q-axis current command value calculation unit 17A is applied to the error calculation unit 18, as in the case of the control circuit 1 described above. The processing subsequent to the processing by the error calculation unit 18 in the control circuit 1A is similar to that in the control circuit 1.

As described above, according to the control circuit 1A, even when a torque command value as a value indicating the target state of the operation of the motor 3 is input to the motor drive control device, an effect similar to that of the control circuit 1 described above can be obtained.

For example, in the embodiment described above, a case of the motor 3 being a surface permanent magnet synchronous motor (SPMSM) is described, but the motor 3 is not limited to this configuration. That is, even when the motor 3 is not the surface permanent magnet synchronous motor (SPMSM) (for example, when the motor 3 is an IPMSM), it is possible to use the motor drive control device 10 according to the present embodiment in a case of performing vector control allowing the d-axis current command value to be always zero, without utilizing reluctance torque.

Furthermore, in the embodiment described above, the control circuit 1 is not limited to the circuit configuration described above. Various circuit configurations configured to meet the object of the present invention can be applied to the control circuit 1.

The number of phases of the motor driven by the motor drive control device according to the embodiment described above is not limited to three phases. Furthermore, the number of Hall elements is not limited to three.

The method of detecting the rotation speed of the motor is not particularly limited. For example, the rotation speed may be detected by using counter electromotive force of the motor, instead of using a Hall element.

The flowchart described above is a specific example and the process flow is not limited to this flowchart. For example, another process may be inserted between each of the steps, or processes may be performed in parallel.

REFERENCE SIGNS LIST

1 . . . Control circuit
2 . . . Drive circuit
2a . . . Inverter circuit
2b . . . Pre-drive circuit
2c . . . Current detection circuit
3 . . . Motor
4, 4u, 4v, 4w . . . Rotation position detector (Hall element)
10 . . . Motor drive control device
11 . . . Drive command acquisition unit
12 . . . Rotation angle acquisition unit
13 . . . Rotation speed acquisition unit
14 . . . Drive current value acquisition unit
15 . . . q-axis current value calculation unit
16 . . . Error calculation unit
17, 17A . . . q-axis current command value calculation unit
18 . . . Error calculation unit
19 . . . Voltage command value calculation unit
20 . . . Lead angle control unit
21 . . . Addition unit
22 . . . Drive control signal generation unit
31 . . . Rotor (rotating element)
100 . . . Motor unit
151 . . . Clarke transform unit
152 . . . Park transform unit
201 . . . Correspondence relationship information
Hu, Hv, Hw . . . Rotation position detection signal
Iu, Iv, Iw . . . Drive current value
Id . . . d-axis current value
Iq . . . q-axis current value
Iqref . . . q-axis current command value
Iα, Iβ . . . Current of two-phase Cartesian coordinate (fixed coordinate) system
Lu, Lv, Lw . . . Coil
Q1 to Q6 . . . Drive transistor
Sc . . . Drive command signal
Sc1 . . . Speed command signal
Sc2 . . . Torque command signal
Sd . . . Drive control signal
Vcc . . . DC power supply
Vuu, Vul, Vvu, Vvl, Vwu, Vwl . . . Drive signal
Vm . . . Current detection signal
Vref . . . Voltage command value
θ . . . Rotation angle
σ . . . Angle
φ . . . Lead angle value with respect to q-axis (angle with respect to q-axis)
δ . . . Lead angle value with respect to d-axis
ω . . . Rotation speed
ωref . . . Target rotation speed

The invention claimed is:

1. A motor drive control device, comprising:
a control circuit configured to output a drive control signal for driving a motor; and
a drive circuit configured to drive the motor on the basis of the drive control signal output from the control circuit, wherein
the control circuit includes:
a processor;
a drive current value receiver configured to acquire a drive current value of a coil of the motor;
a rotation angle receiver configured to acquire a rotation angle of a rotor of the motor;
the processor configured to acquire a rotation speed of the rotor;
the processor configured to calculate a q-axis current value of a two-phase rotating coordinate system on the basis of the drive current value acquired by the drive current value receiver and the rotation angle of the rotor acquired by the rotation angle-receiver;
the processor configured to calculate a q-axis current command value of the two-phase rotating coordinate system on the basis of a value indicating a target state of an operation of the motor;
the processor configured to calculate a voltage command value of the two-phase rotating coordinate system to reduce a difference between the q-axis current command value calculated by the processor and the q-axis current value calculated by the processor;
the processor configured to calculate a lead angle value allowing a d-axis current value of the two-phase rotating coordinate system to be zero, on the basis of the q-axis current value calculated by the processor and the rotation speed of the rotor acquired by the processor;
the processor configured to add the lead angle value and the rotation angle of the rotor, and to output the added value as an angle of the vector of the voltage command value; and
a drive control signal transmitter configured to generate the drive control signal by performing a space vector conversion using the angle of the vector of the voltage command value output and the voltage command value calculated by the processor.

2. The motor drive control device according to claim 1, wherein
the lead angle value allowing the d-axis current value of the two-phase rotating coordinate system to be zero is a value based on an angle of a vector of the voltage command value with respect to a q-axis when a component of the vector of the voltage command value in a d-axis direction coincides with a d-axis voltage value at the time of the d-axis current value Id of zero.

3. The motor drive control device according to claim 1, wherein
the processor includes correspondence relationship information indicating a correspondence relationship among the rotation speed of the rotor, the q-axis current value, and the lead angle value, and calculates the lead angle value on the basis of the correspondence relationship information.

4. The motor drive control device according to claim 3, wherein
the correspondence relationship information is a table having the lead angle value associated with every combination of the rotation speed of the rotor and the q-axis current value.

5. The motor drive control device according to claim 3, wherein
the correspondence relationship information includes a function expressed by Equation (A) below, where Vref is the voltage command value, ω is the rotation speed of the rotor, Lq is a q-axis inductance, Iq is the q-axis current value, and φ is the angle of the vector of the voltage command value with respect to the q-axis:

$$\phi = \sin^{-1}\frac{\omega L_q I_q}{V_{ref}}. \qquad (A)$$

6. The motor drive control device according to claim 2, wherein
the processor calculates the lead angle value by adding π/2 to the angle of the vector of the voltage command value with respect to the q-axis.

7. The motor drive control device according to claim 1, wherein
the value indicating the target state of the operation of the motor is a target value of a rotation speed of the motor, and
the processor calculates the q-axis current command value to reduce a difference between the target value of the rotation speed of the motor and the rotation speed of the rotor acquired by the processor.

8. The motor drive control device according to claim 1, wherein
the value indicating the target state of the operation of the motor is a target value of torque of the motor.

9. A motor drive control method, comprising:
a first step of acquiring a rotation angle of a rotor of a motor;
a second step of acquiring a rotation speed of the rotor;
a third step of acquiring a drive current value of a coil of the motor;
a fourth step of calculating a q-axis current value of a two-phase rotating coordinate system on the basis of the drive current value acquired in the third step and the rotation angle of the rotor acquired in the first step;
a fifth step of calculating a q-axis current command value of the two-phase rotating coordinate system on the basis of a value indicating a target state of an operation of the motor;
a sixth step of calculating a voltage command value of the two-phase rotating coordinate system to reduce a difference between the q-axis current command value calculated in the fifth step and the q-axis current value calculated in the fourth step;
a seventh step of calculating a lead angle value allowing a d-axis current value of the two-phase rotating coordinate system to be zero on the basis of the q-axis current value calculated in the fourth step and the rotation speed of the rotor acquired in the second step;
an eighth step of adding the lead angle value and the rotation angle of the rotor, and of outputting the added value as an angle of the vector of the voltage command value; and
a ninth step of generating a drive control signal for controlling drive of the motor, by performing a space vector conversion using the angle of the vector of the voltage command value in the eighth step and the voltage command value calculated in the sixth step.

* * * * *